United States Patent
Phinney

(10) Patent No.: US 8,323,371 B2
(45) Date of Patent: Dec. 4, 2012

(54) PROCESS FOR SYNTHESIZING A COMPACTED PRODUCT

(75) Inventor: Robin Phinney, Okotoks (CA)

(73) Assignee: Kamalyte Resources Inc., Okotoks (CA)

( * ) Notice: Subject to any disclaimer, the term of this patent is extended or adjusted under 35 U.S.C. 154(b) by 337 days.

(21) Appl. No.: 12/539,688

(22) Filed: Aug. 12, 2009

(65) Prior Publication Data

US 2010/0040882 A1 Feb. 18, 2010

(30) Foreign Application Priority Data

Aug. 13, 2008 (CA) .................................... 2638704

(51) Int. Cl.
*B28B 3/12* (2006.01)
*C05D 1/02* (2006.01)

(52) U.S. Cl. ... 71/63; 264/176.1; 264/210.1; 264/210.6; 423/274; 423/499.1

(58) Field of Classification Search ................ 71/53, 63; 423/499.1, 274; 264/210.6, 176.1, 210.1
See application file for complete search history.

(56) References Cited

U.S. PATENT DOCUMENTS

| | | | |
|---|---|---|---|
| 4,217,333 A | 8/1980 | Löblich | |
| 4,248,601 A * | 2/1981 | McGough et al. | ........... 23/293 R |
| 4,276,154 A | 6/1981 | Singewald et al. | |
| 4,297,207 A | 10/1981 | Singewald et al. | |
| 4,385,920 A * | 5/1983 | Dancy et al. | ........................ 71/36 |
| 5,264,017 A * | 11/1993 | Van de Walle | ........................ 71/61 |
| 5,503,641 A | 4/1996 | Bakardjiev et al. | |
| 6,013,209 A | 1/2000 | Phinney | |
| 6,132,484 A | 10/2000 | Phinney | |
| 6,293,985 B1 | 9/2001 | Phinney | |
| 6,299,663 B1 | 10/2001 | Phinney | |
| 6,331,193 B1 | 12/2001 | Phinney | |
| 6,379,414 B1 * | 4/2002 | Kleine-Kleffmann et al. | ... 71/61 |
| 6,454,979 B1 | 9/2002 | Phinney | |
| 6,692,716 B1 | 2/2004 | Phinney | |
| 6,805,821 B2 * | 10/2004 | Phinney | ........................ 264/117 |
| 7,727,501 B2 * | 6/2010 | Ferguson et al. | ............. 423/266 |
| 2002/0056948 A1 * | 5/2002 | Highsmith | .................... 264/489 |
| 2005/0036929 A1 | 2/2005 | Ferguson et al. | |

* cited by examiner

*Primary Examiner* — Wayne Langel
(74) *Attorney, Agent, or Firm* — Paul S. Sharpe; Perley-Robertson, Hill & McDougall LLP

(57) ABSTRACT

A method forming a potassium chloride particle form potassium chloride powder having resistance to moisture absorption and shrinkage. The original feedstock comprises potassium chloride in a size distribution of 30 mesh and 100 mesh as well as a gluten based binder.

7 Claims, 1 Drawing Sheet

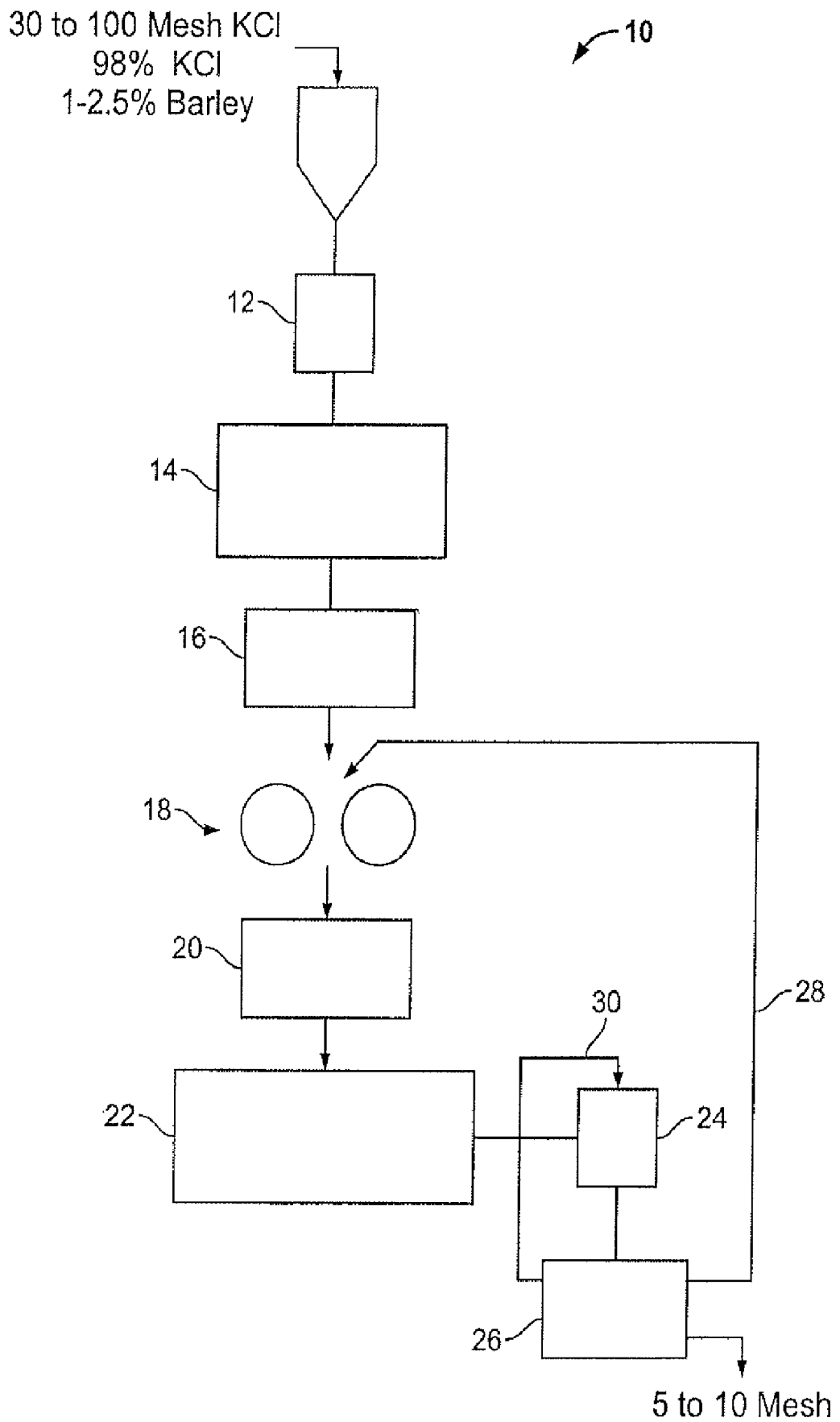

PROCESS FOR SYNTHESIZING A COMPACTED PRODUCT

CROSS-REFERENCE TO RELATED APPLICATIONS

This application claims benefit from Canadian Patent Application No. 2,638,704 filed Aug. 13, 2008.

FIELD OF THE INVENTION

The present invention relates to a process for synthesizing a compacted product and more particularly, the present invention relates to a process for synthesizing potassium chloride which is hygroscopically resistant and thus can be stored without particle accretion.

BACKGROUND OF THE INVENTION

As is generally known, potassium chloride occurs as sylvite. The compound is also known as muriate of potash and can be extracted from salt water. Further methodology to synthesize the compound is by crystallization from solution, electrostatic separation from suitable minerals or flotation.

Other methods for forming potassium chloride include the preparation from solid ore. The ore is exposed to solution stripping and multi-element crystallization. Generally the stripping solution from the rejected liquid, salt and water generated in processing carnallite is selectively stripped the from the solid potassium salt ore to obtain halogen liquid. The liquid is rich in potassium chloride which is subsequently crystallized.

There are innumerable other methods to achieve synthesis, however, these are typically limited in the same manner; expensive unit operations and the inability of the product to be stored without significant moisture absorption.

Kali and Salz Aktiengesellschaft patented a method for manufacturing potassium chloride having a high potassium oxide content (55 wt.%). The precursor was the fine salt resulting from the degradation of carnallite In the process alkyl amine salts are used as conditioning agents and flotation media containing magnesium and potassium chloride are used to separate this fine decomposition salt in an initial flotation stage into a grain size fraction of less than 0.1 mm as a first concentrate and a residue having a grain size of more than 0.315 mm. Subsequent to auxiliary conditioning, the residue is again floated and the potassium chloride surfaces as a second concentrate. The potassium chloride is separated from the mixture without any further conditioning in another flotation stage, and collected.

Ferguson et al., in United States Patent Publication 2005/0036929, published Feb. 17, 2005, disclose an apparatus and method for the production of a compacted potassium chloride granule Essentially, the method includes the use of sodium hexametaphosphate as a binder which is added to the potassium chloride feedstock. The binder is indicated to sequester moisture.

In U.S. Pat. No. 5,503,641, issued Apr. 2, 1996, to Bakardjiev et. al., there is disclosed a process for synthesizing potassium chloride where a multitude of unit operations are required to effect the result. Many of the operations are involved and require high energy expenditures.

Having regard to the fact that potassium chloride crystals are very high energy and high stress, dendrites can form between crystals when the same are stored in conditions having relative humidity of greater than approximately 70%. In this manner, the material must be purchased and immediately used in order to avoid particle accretion.

It would be desirable to have a process where the unit operations were minimized with a low energy requirement with the resulting product being resistant to moisture absorption.

The present invention satisfies these goals.

SUMMARY OF THE INVENTION

One object of one embodiment of the present invention is to provide an improved process for synthesizing potassium chloride.

A further object of one embodiment of the present invention is to provide a method for synthesizing a compacted potassium chloride fertilizer product, comprising:
 providing a source of potassium chloride in a size distribution of between 30 mesh and 100 mesh;
 pulverizing a mixture of the source of potassium chloride in the presence of a binder;
 compacting the mixture into flakes;
 drying the flakes; and
 crushing the flakes to yield a product in a size distribution of between 5 mesh and 10 mesh.

It has been found that the use of a grain type binder is particularly effective in inhibiting moisture absorption into the pellets or granules. The mechanism is not precisely known, however when the binder is commingled with the potassium chloride, the final results are favourable.

Another object of one embodiment of the present invention is to provide a potassium chloride granule synthesized in accordance with the methodology as set forth in claim 1.

It has been found that by making use of a roll crusher a significant increase in the yield of the product can be achieved. The size and operating parameters will be appreciated by one skilled. As an alternative, the crusher may be an impact crusher.

Having thus generally described the invention, reference will now be made to the accompanying drawings illustrating preferred embodiments.

BRIEF DESCRIPTION OF THE DRAWINGS

The figure is a schematic illustration of the process according to one embodiment of the present invention.

DETAILED DESCRIPTION OF THE PREFERRED EMBODIMENTS

The figure shown is the overall process, globally dented by numeral 10. Initially, potassium chloride in a size distribution of between 30 mesh and 100 mesh containing 98% potassium chloride is fed commonly with binder material into a suitable pulverizer 14 via feeder 12.

With respect to the binder, suitable examples include the grain type which are gluten containing. It has been found that binder in an amount from between 1% and 2.5% by weight is effective. In situations where the binder is deficient any moisture, water may be added at 16 in an amount of between 0.1% by weight and 0.5% by weight.

The newly formed feed material is then fed to a counter rotating roller system 18 and is squeezed at approximately a range of between 1000 psi and 2000 psi. This is 20% of the force provided by a typical compactor. The use of the rollers 16 is useful to consolidate the material, i.e. the binder and potassium chloride to be homogenously distributed into flakes. This is in marked contrast with compactor systems which have a proclivity towards non uniform dispersion of the potassium and binder within the compacted product. This obviously has ramifications in terms of efficacy of the final product, since potassium concentrations could vary widely.

The flaked product is then passed on to a flake breaker 20 which breaks the flakes into smaller shapes (not shown). The flakes are then transferred to a dryer 22 and subsequently to a roll crusher 24. The latter may also be replaced by an impact crusher (not shown) in order to generate a final product in a size distribution of between 4 mesh and 12 mesh subsequent to screening at 26. Oversized particles may be recycled to the roll crusher 24 via line 30. Undersized particles may be recycled to rollers 18 via line 28.

Observing the noted protocol results in a yield of approximately 60% to 70% of the size distribution noted, the final product having reduced hygroscopicity relative to particle formed by alternative processes in the prior art.

Where an impact mill was employed for the crushing operation, the size distribution of between 4 mesh and 12 mesh was produced in a yield of approximately 30% to 40% Accordingly, the roll crusher has a significant effect on the final yield of the product.

By making use of fine potassium chloride in synthesizing the particle, moisture damage in terms of inducing clumping and/or particle or granular accretion is avoided. This has the distinct advantage of resulting in an inherently more stable product which remains intact as granulated in terms of size and flowability. The surface layer of the granule has been found to withstand up to 1% moisture without degradation. Upon a reduction in relative humidity to daytime levels, i.e. below 40%, the layer dries thus restoring the product to its original state.

Under conventional methods of formation, the product is sold as "distressed" and re-screened to obtain product which is useable. This inconvenience is further exacerbated by the fact that when the product is warehoused, shrinkage of the order of between 2% and 5% is commonplace. These inconveniences are simply accepted in the art and add additional cost for processing. In marked contrast, the instant technology provides for higher yields and resistance to moisture damage.

Although embodiments of the invention have been described above, it is limited thereto and it will be apparent to those skilled in the art that numerous modifications from part of the present invention insofar as they do not depart from the spirit, nature and scope of the claimed and described invention.

I claim:

1. A method for synthesizing a compacted potassium chloride fertilizer product, comprising:
    providing a source of potassium chloride in a size distribution of between 30 mesh and 100 mesh;
    pulverizing a mixture of said source of potassium chloride in the presence of a binder, said binder being a gluten containing grain type binder present in an amount between 1% to 2.5% by weight;
    feeding the pulverized mixture to a counter rotating roller system and squeezing the mixture at a pressure of between 1000 and 2000 psi to homogenously distribute said binder and said potassium chloride into flakes;
    drying said flakes; and
    crushing said flakes in a roll or impact crusher to yield a product in a size distribution of between 4 mesh and 12 mesh in a yield of between 30% and 40%.

2. The method as set forth in claim 1, wherein a source of water is added to said mixture in an amount from between 0.1% by weight and 0.5% by weight.

3. The method as set forth in claims 1 or 2, wherein crushing is performed using a roll crusher.

4. The method as set forth in claim 1, wherein crushing is performed using an impact crusher.

5. The method as set forth in claim 1, wherein crushed flakes are screened with screen means.

6. The method as set forth in claim 1, wherein oversized crushed particles are recycled to undergo additional crushing.

7. The method as set forth in claim 1, wherein at least a portion of screened material is recycled for compaction.

* * * * *

UNITED STATES PATENT AND TRADEMARK OFFICE
CERTIFICATE OF CORRECTION

| | | |
|---|---|---|
| PATENT NO. | : 8,323,371 B2 | Page 1 of 1 |
| APPLICATION NO. | : 12/539688 | |
| DATED | : December 4, 2012 | |
| INVENTOR(S) | : Robin Phinney | |

It is certified that error appears in the above-identified patent and that said Letters Patent is hereby corrected as shown below:

On the title page, item (73)

Assignee "Kamalyte Resources Inc." should read -- Karnalyte Resources Inc. --.

Signed and Sealed this
Twenty-first Day of June, 2016

Michelle K. Lee
*Director of the United States Patent and Trademark Office*